United States Patent Office 3,266,267
Patented August 16, 1966

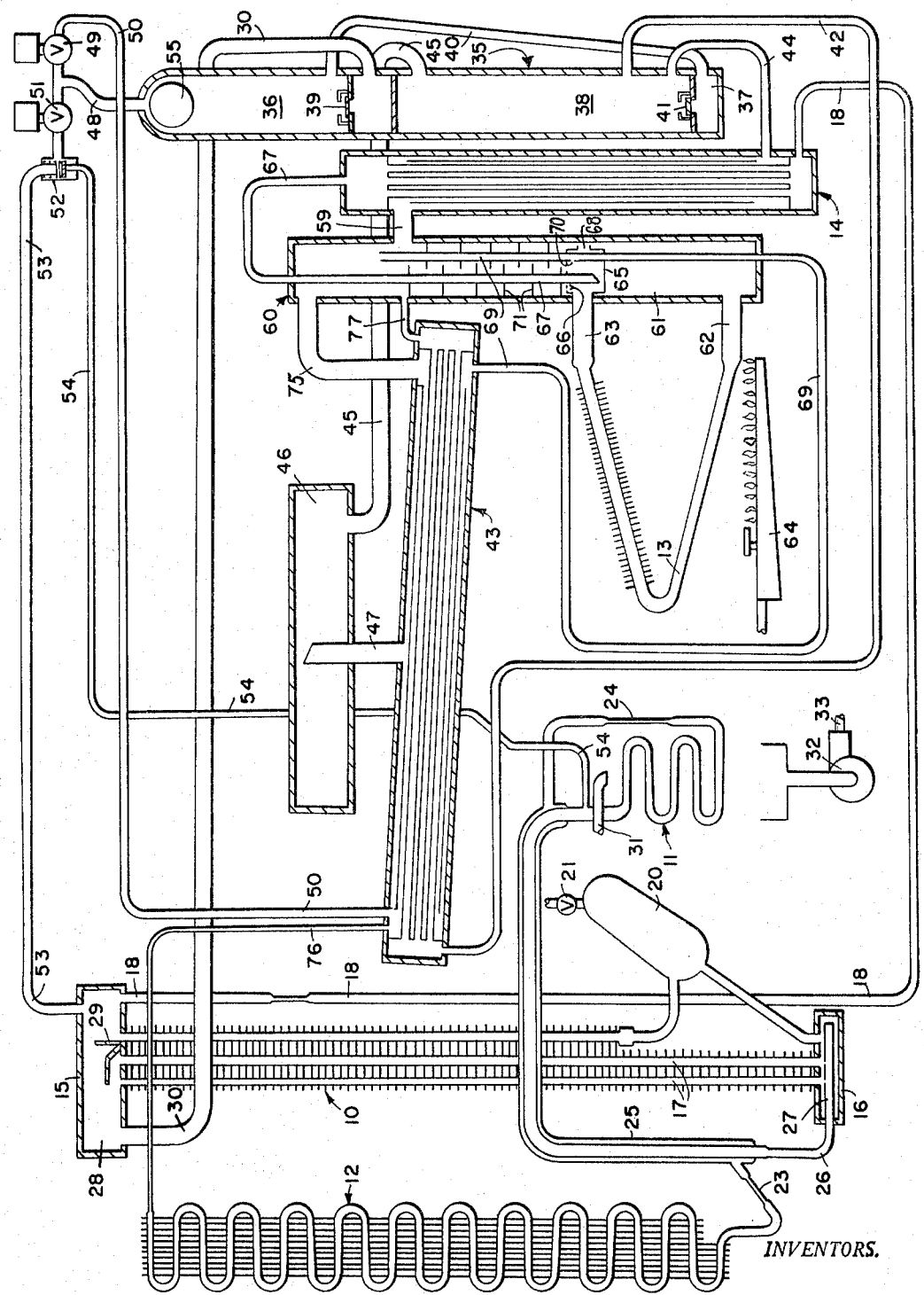

3,266,267
ABSORPTION REFRIGERATION
Richard H. Merrick and Richard A. English, Indianapolis, Ind., assignors to Carrier Corporation, Syracuse, N.Y., a corporation of Delaware
Filed May 20, 1964, Ser. No. 368,932
2 Claims. (Cl. 62—476)

This invention relates to absorption refrigeration, and more particularly, to absorption refrigeration machines of the type which employ a refrigerant heat exchanger.

Absorption refrigeration machines of the type herein described, generally employ a generator section, a condenser section, an absorber section, and an evaporator section, arranged to provide refrigeration. A liquid refrigerant is supplied to the evaporator where it absorbs heat from a load to be cooled and is vaporized. The vaporized refrigerant is absorbed in an absorbent solution in the absorber. The diluted or weak absorbent solution, having refrigerant vapor absorbed therein, is forwarded to the generator where it is heated to drive off refrigerant vapor and to concentrate the absorbent. The concentrated absorbent is returned to the absorber, and the vapor is passed to the condenser where it is liquefied and returned to the evaporator.

In such systems a thermodynamic advantage can be achieved by passing the relatively warm refrigerant flowing from the condenser to the evaporator in heat exchange relation with the relatively cold refrigerant vapor passing from the evaporator to the absorber. This thermodynamic advantage may be realized by connecting a refrigerant heat exchanger to the appropriate refrigerant lines. It will be apparent that when a refrigerant heat exchanger is employed in an absorption refrigeration system, the cold refrigerant is enabled to sub-cool the refrigerant from the condenser so as to increase the capacity of the refrigerant to absorb heat from the load to be cooled, thus resulting in an improvement in efficiency.

In an absorption refrigeration machine, wherein ammonia is employed as the refrigerant and water as an absorbent solution, it is virtually impossible to strip all of the absorbent vapor from the vapor being passed to the condenser. Consequently, the liquid being fed to the evaporator from the condenser contains a small amount of absorbent solution. Even though the amount of absorbent passed to the evaporator is small, it is capable of absorbing many times its own volume of refrigerant and results in an appreciable loss in system efficiency because the absorbed refrigerant obviously does not perform useful work. However, by use of a refrigerant heat exchanger as previously described, the relatively warm refrigerant passing through one side of the refrigerant heat exchanger toward the evaporator causes the absorbed refrigerant to be vaporized from the absorbent which passes with the refrigerant through the other side of the refrigerant heat exchanger to the absorber. Thus, useful work is recovered from the refrigerant absorbed in the absorbent contamination and a further increase in cycle efficiency is thereby achieved.

A problem, however, arises when using a refrigerant heat exchanger of the type described above, particularly when used in an absorption refrigeration machine. It will be apparent that the refrigerant restriction must be located between the heat exchanger and the evaporator since a restriction upstream of the heat exchanger would result in heating the refrigerant passed to the evaporator rather than cooling it. However, when the refrigerant restriction is located between the refrigerant heat exchanger and the evaporator, the returning refrigerant passing from the evaporator to the absorber may cause too much subcooling of the refrigerant. As is well known, highly subcooled refrigerant passes through a fixed restriction freely, and under such conditions the evaporator soon becomes flooded with refrigerant while the condenser becomes completely drained. This flooding refrigerant passes through the refrigerant heat exchanger condensing and subcooling more refrigerant in the refrigerant heat exchanger, which in turn makes the condition worse. Furthermore, the unevaporated liquid refrigerant, after flooding the evaporator coil, passes into the absorber section where it rapidly dilutes the absorbent solution. Not only does this refrigerant do little useful cooling work, thereby reducing the efficiency of the system, but also by diluting the absorbent in the absorber, it causes the evaporator temperature to rise. As the evaporator temperature rises, less heat is transferred to the liquid refrigerant therein, the cooling capacity of the refrigeration machine is reduced, and more unevaporated refrigerant is passed through the refrigerant heat exchanger, which in turn causes more subcooling, more flooding of the evaporator and the absorber, and more loss of capacity. It will be apparent that there is a snowballing effect under such circumstances which results in the refrigerant restriction losing control of the refrigerant and causes the machine to become less efficient.

Accordingly, it is an object of this invention to provide a refrigeration system which employs a solution heat exchanger while at the same time overcoming the disadvantages which previously attended its use.

It is a further object of this invention to provide an improved absorption refrigeration machine and method of operating the same.

These and other objects of this invention are achieved in the illustrated preferred embodiment thereof by providing a pair of fixed restrictions to refrigerant flow in an absorption refrigeration machine. The first fixed restriction is located between the refrigerant heat exchanger and the evaporator and serves to expand the refrigerant from the condenser down to an intermediate pressure and temperature, where it is cooled by refrigerant vapor returning to the absorber. This cooled refrigerant is then expanded through the second fixed restriction down to the evaporator temperature and pressure. The thermodynamic advantages of employing a refrigerant heat exchanger are thereby achieved. However, under such circumstances the tendency to excessively subcool refrigerant and flood the evaporator is prevented by the first fixed restriction. Even though refrigerant passing to the evaporator through the refrigerant heat exchanger becomes excessively subcooled and passes freely through the second fixed restriction, it will be apparent that the first fixed restriction is insensitive to the subcooling done in the refrigerant heat exchanger and this restriction maintains control of the refrigerant to prevent flooding of the evaporator and the absorber sections.

These and other objects of this invention will become more apparent by reference to the following detailed description and attached drawing wherein the figure is a schematic diagram, partly in cross section of an absorption refrigeration machine embodying this invention.

Referring particularly to the drawing, there is shown a preferred embodiment of the invention which is illustrated with reference to an absorption refrigeration machine comprising an absorber section 10, an evaporator section 11, an air-cooled condenser section 12, a generator section 13, and a heat exchanger section 14. A refrigeration machine of the type herein described may desirably use ammonia as a refrigerant and water as an absorbent solution; other refrigerant and absorbent combinations may be used instead, if desired. As used herein, the term "strong solution" refers to an absorbent solution such as relatively pure water which is strong in absorbing power, and the expression "weak solution" refers to a dilute solution of absorbent having substantial refrigerant absorbed therein, which is weak in absorbing power.

Absorber section 10 comprises an upper header 15 and a lower header 16 connected by a plurality of heat exchange tubes 17. A strong solution line 18 forwards strong solution into upper header 15 from which it passes downwardly to lower header 16 through one or more recirculation lines 17. A suitable purge tank 20 with a purge valve 21 therein may be provided for the collection and purging of relatively noncondensible gases.

Liquid refrigerant is supplied from condenser 12 and passes serially through a first fixed restriction 23, through one side of a refrigerant heat exchanger 25, and through a second fixed restriction 24 to evaporator coil 11. Preferably, first restriction 23 and second restriction 24 both comprise lengths of capillary tubing having a diameter smaller than the diameter of the passage through condenser 12 and the first side of refrigerant heat exchanger 25. Alternatively, restrictions 23 and 24 may comprise a plurality of orifice plates having properly sized openings therein and may be combined with a refrigerant stariner, if desired. Heat exchanger 25 is shown in the drawing as comprising a double wall tube wherein the first side of the heat exchanger is formed by a passage between the interior wall of the outer tube and the exterior wall of an inner tube. The second side of heat exchanger 25 is formed by the passage extending through the inner tube. Both sides of heat exchanger 25 are preferably relatively unrestricted, although, if optimum efficiency is not required, the first side of the refrigerant heat exchanger may comprise the second restriction in an absorption refrigeration machine. It will be observed that the refrigerant passes directly from condenser 12 through restriction 23 to the outside of heat exchanger 25 from which it passes directly to evaporator 11; in this sense the term "directly" is used to indicate that the refrigerant flows only through a restriction or other passage and not through another evaporator.

Liquid refrigerant is vaporized in evaporator coil 11 and the vapor is returned through the other side of refrigerant heat exchanger 25 and refrigerant vapor line 26 to vapor distributor 27 in lower header 16 of absorber section 10. Water to be chilled, which comprises the load on the refrigeration machine, is supplied through entering chilled water line 31 and distributed over the coil in evaporator section 11 where it is chilled by giving up its heat to vaporize the refrigerant passing through the evaporator coil. This chilled water is then forwarded by chilled water pump 32, through leaving chilled water line 33, to cool a desired region, and is returned through entering chilled water line 31 for recooling.

The refrigerant vapor is injected into heat exchange tubes 17 of absorber section 10 where the refrigerant vapor is absorbed in the strong absorbent solution, thus rendering it weak solution when it reaches upper header 15. Weak solution in upper header 15 is segregated in a weak solution sump 28 formed by a baffle 29. The weak solution is forwarded to generator section 13 from absorber section 10 through weak solution line 30.

In order to pump weak solution from the low pressure absorber side of the system to the high pressure generator side of the system, a trap 35 is provided. Trap 35 comprises an upper chamber 36, a lower chamber 37 and an intermediate chamber 38 to heat exchanger 14. A third provided between weak solution line 30 and upper chamber 36. A solution line 40 is provided between upper chamber 36 and lower chamber 37. A lower check valve 41 is provided between lower chamber 37 and intermediate chamber 38. A line 42 connects intermediate chamber 38 to rectifier section 43, and another line 44 connects intermediate chamber 38 to heat exchanger 14. A third line 45 connects the upper portion of intermediate chamber 38 with an outlet tank 46 which is vented through line 47 to the vapor side of rectifier 43.

An equalizer line 48 connects upper chamber 36 to the high pressure vapor side of rectifier section 43 through high pressure valve 49 and high pressure vapor line 50. Equalizer line 48 is also connected through low pressure valve 51, blow-down check valve 52 and low pressure vapor line 53 to the low pressure vapor space in upper header 15 of absorber section 10. A line 54 extends from blow-down check valve 52 to refrigerant vapor line 26 at some convenient point. A float 55 may be provided in upper chamber 36 to minimize the surface area of solution exposed therein.

To forward weak solution from line 30 to the high pressure side of the system, high pressure valve 49 is closed and low pressure valve 51 is opened, thereby venting upper chamber 36 to upper header 15. Weak solution flows by gravity through line 30 into upper chamber 36 through check valve 39 and into lower chamber 37 through line 40. This solution cannot flow through check valve 41 because the valve is maintained closed by the pressure exerted on intermediate chamber 38 by high pressure vapor at the top of outlet tank 46, which is vented to the high pressure side of rectifier 43. After upper chamber 36 has been filled with absorbent solution, or preferably after a predetermined time interval for filling chamber 36 has passed, low pressure valve 51 is closed and high pressure valve 49 is opened. Opening of high pressure valve 49 vents upper chamber 36 to the high pressure side of the system through line 50 which is connected to the high pressure vapor side of rectifier 43. Consequently, solution in upper chamber 36 may then drain through line 40, lower chamber 37, and check valve 41, into intermediate chamber 38. This solution then drains by gravity from intermediate chamber 38 through line 42 to rectifier 43 and through line 44 to heat exchanger 14. The rectifier and heat exchanger constitute a substantially fixed restriction to the drainage of solution from chamber 38 and the excess solution drains through line 45 into outlet tank 46 which may actually comprise any suitable region or other suitable means for storage of the solution which does not immediately pass through either the heat exchanger or the rectifier.

After a period of time, high pressure valve 49 is closed and low pressure valve 51 is again opened. Upon opening of low pressure valve 51, the high pressure vapor remaining in the top of upper chamber 36 from the previous portion of the cycle, pushes upwardly on the underside of blow-down check valve 52, closing communication between equalizer line 48 and low pressure line 53, while at the same time exhausting the high pressure vapor into refrigerant vapor line 26. This high pressure vapor is absorbed in the absorber section along with refrigerant vapor from the evaporator formed in the evaporator coil. After the high pressure vapor is exhausted from upper chamber 36, blow-down check valve 52 closes to its normal position and vents upper chamber 36 to upper header 15 of absorber section 10 to begin the cycle again.

The side of heat exchanger 14 which carries weak solution from line 44 is connected by line 59 to analyzer section 60. Analyzer 60 comprises a vertically extending column 61 for storing of a substantial quantity of weak absorbent solution therein. An inlet 62 for passing absorbent solution to generator 13 is provided adjacent the lower end of the column of absorbent solution in analyzer 60. A gas burner 64 is provided to heat absorbent solution passed to generator 13, in order to concentrate the absorbent solution by vaporizing refrigerant therefrom. The mixture of vapor and concentrated absorbent formed in generator 13 is passed through outlet 63 to a separation chamber 65 disposed within the column of absorbent solution in analyzer 60.

Separation chamber 65 preferably comprises a generally closed chamber having a top provided with a number of perforations or apertures 66 and an overflow and equalizer hole 68 in the side thereof. A strong solution discharge line 67 is provided to withdraw strong solution from separation chamber 65 and pass it to the strong solution side of heat exchanger 14 from which it passes through strong solution line 18 to absorber 10. The hot strong solution from the generator is thus passed in heat exchange relation with the relatively cooler weak solution passing to the generator through the analyzer as well as the weak solution side of heat exchanger 14 in order to economize the heating required in the generator.

The perforations or apertures 66 in the top of separation chamber 65 are made of a size sufficient to maintain a small pressure difference between the solution within chamber 65 and that of the solution stored in analyzer 60. Consequently, a small vapor space exists above the level of solution in separation chamber 65 which results from the separation of vapor and strong solution therein. The apertures in the upper portion of separation chamber 65 are arranged so as to distribute vapor evenly throughout the cross section of the analyzer. This hot vapor, which contains a substantial fraction of absorbent vapor as well as refrigerant vapor is passed upwardly through the column of solution in the analyzer section. A plurality of horizontal baffles 71 may be provided to form a serpentine path for the passage of the vapor bubbles, if desired. A mass and heat transfer relation takes place such that refrigerant is vaporized from the solution in the analyzer by contact with the relatively hot vapor, while at the same time the vaporized refrigerant is replaced by absorbent vapor which condenses into the absorbent solution. Consequently, the vapor reaching the upper portion of analyzer 60 is richer in refrigerant and poorer in absorbent than that which was injected into the analyzer from separation chamber 65.

The vapor, having an enriched refrigerant fraction, is forwarded from analyzer 60 through vapor line 75 to the vapor side of rectifier 43. The vapor is cooled in rectifier 43 by heat exchange with the relatively cool weak solution passing from line 42 through the weak solution side of the rectifier. Consequently, the vapor is further purified in the rectifier by condensing additional absorbent therefrom. Relatively pure refrigerant vapor emerging from rectifier 43 is forwarded through line 76 to condenser 12 where it is liquefied and passed to evaporator 11 as previously described. The absorbent, which is condensed in the vapor side of rectifier 43 is passed through rectifier condensate line 69 upwardly through the column of absorbent solution in analyzer 60. An aperture 70 is provided in line 69 above the level of solution in separation chamber 65 and below the top of the chamber to admit a controlled quantity of vapor into rectifier condensate line 69. Aperture 70 allows the admission of a small quantity of vapor into rectifier condensate line 69 so as to reduce the density of the solution therein, thereby causing the rectifier condensate to drain from the rectifier, through rectifier condensate line 69, into analyzer section 60 at a slightly higher elevation due to the vapor lift action in line 69.

Weak solution passed to the solution side of rectifier 43 is drained from the rectifier through line 77 into analyzer 60. Both line 77 and line 59 are connected to analyzer 60 below the level of solution therein and line 45 is connected to the outlet tank below the level of solution therein so as to provide a continuous liquid column from the solution in outlet tank 46 through rectifier 43 and through heat exchanger 14 to the solution stored in the analyzer. It will be observed that outlet tank 46 is disposed at least partially above the level of solution in analyzer 60 so that there exists a solution head between the solution level in the outlet tank and the solution level in the analyzer to pass absorbent solution from the outlet tank into the analyzer. Thus, solution is enabled to drain from outlet tank 46 into analyzer 60 and generator 13 during periods of time when trap 35 is admitting solution into chamber 36 as well as whenever the solution requirements of the generator section increase.

In operation refrigerant is liquefied in condenser 12 and passes serially through first restriction 23, through the first side of heat exchanger 25 through second restriction 24 into evaporator 11. The refrigerant is vaporized by absorbing heat from the load to be cooled and the relatively cooled vaporized refrigerant is passed through the second side of heat exchanger 25 from evaporator 11 to absorber 10 where the refrigerant vapor is absorbed in the absorbent solution. The relatively cool refrigerant vapor passing through heat exchanger 25 absorbs additional heat from the refrigerant flowing through the first side of the refrigerant heat exchanger and effectively increases the efficiency of the refrigeration system. Because the vapor leaving the second side of refrigerant heat exchanger 25 is at a higher temperature than that at which it entered, some refrigerant will be vaporized from any absorbent which contaminates the refrigerant. The vaporization of this refrigerant during its passage through the second side of refrigerant heat exchanger 25 produces useful cooling of the refrigerant passing through the first side thereof and hence this cooling, which would otherwise be lost, further improves the efficiency of the refrigeration machine.

In the event that liquid refrigerant is passed to the second side of heat exchanger 25, first restriction 23 will maintain control of the refrigerant and check further flooding of the evaporator 11. Because the refrigerant heat exchanger is located downstream from first restriction 23, the additional cooling imparted to the refrigerant by the heat exchanger cannot materially affect the flow of refrigerant through the first restriction. In any event, should the condenser be drained of refrigerant liquid, first restriction 23 will be effective to prevent free flow of vapor into the first side of heat exchanger 25, so that the heat exchanger cannot act as a condenser and cause further flooding of the evaporator. Preferably, the two sides of refrigerant heat exchanger 25 are relatively unrestricted so that any desired or optimum amount of heat transfer surface may be employed in the heat exchanger.

The refrigerant passed through first restriction 23 is flashed or expanded to an intermediate temperature in the first side of refrigerant heat exchanger 25 which is above evaporator temperature. Consequently, heat will pass from the refrigerant passing through the first side of heat exchanger 25 to the relatively cool vapor passing through the second side of the heat exchanger, thereby improving the efficiency of the refrigeration machine. Thereafter, the refrigerant is flashed or expanded down to evaporator pressure through second restriction 24.

By the practice of this invention the efficiency of an absorption refrigeration machine may be improved without experiencing uncontrollable flooding. It will be appreciated that both the refrigerant restrictions and refrigerant heat exchanger may take forms other than those illustrated in the preferred embodiment thereof without departing from the scope of this invention.

While there has been described a preferred embodiment of this invention, it will be appreciated that the invention may be otherwise embodied within the scope of the following claims.

We claim:
1. An absorption refrigeration machine comprising:
  an absorber section for the absorption of refrigerant vapor;
  an evaporator section for evaporation of a refrigerant liquid and cooling of a refrigeration load;
  a generator section for vaporizing refrigerant and concentrating absorbent solution;
  a condenser section for liquefying refrigerant vapor formed in said generator section;
  a refrigerant heat exchanger, having a first side and a second side, for passing a fluid through said first side in heat exchange relation with a fluid passing through said second side thereof;

first refrigerant passage means extending directly between said first side of said refrigerant heat exchanger and said condenser section for passing refrigerant from said condenser section through said first side of said refrigerant heat exchanger;

first fixed refrigerant flow restriction means disposed in said first refrigerant passage means;

second refrigerant passage means extending between said first side of said refrigerant heat exchanger and said evaporator section, for passing refrigerant from said first side of said refrigerant heat exchanger to said evaporator section;

second fixed refrigerant flow restriction means disposed in said second refrigerant passage means;

third refrigerant passage means extending between said evaporator section and said second side of said refrigerant heat exchanger, for passing refrigerant and absorbent solution contaminating said refrigerant having refrigerant absorbed therein from said evaporator section through said second side of said refrigerant heat exchanger in heat exchange relation with refrigerant passing through said first side thereof to evaporate refrigerant from said absorbent solution, thereby cooling the refrigerant passing through the first side of said refrigerant heat exchanger, and recovering useful work from the refrigerant absorbed in the absorbent solution which contaminates the refrigerant passed through said evaporator section; and fourth refrigerant passage means extending from said second side of said refrigerant heat exchanger to said absorber section, for passing refrigerant from said second side of said refrigerant heat exchanger to said absorber section.

2. An absorption refrigeration machine comprising:

an absorber section for the absorption of refrigerant vapor;

an evaporator section for evaporation of a refrigerant liquid and cooling of a refrigeration load;

a generator section for vaporizing refrigerant and concentrating absorbent solution;

a condenser section for liquefying refrigerant vapor formed in said generator section;

a refrigerant heat exchanger, having a relatively unrestricted first side and a relatively unrestricted second side, for passing a fluid through said first side in heat exchange relation with a fluid passing through said second side of said refrigerant heat exchanger;

first refrigerant passage means extending directly between said first side of said refrigerant heat exchanger and said condenser section, for passing refrigerant from said condenser section through said first side of said refrigerant heat exchanger, said first refrigerant passage means comprising a capillary tube restriction;

second refrigerant passage means extending directly between said first side of said refrigerant heat exchanger and said evaporator section, for passing refrigerant from said first side of said refrigerant heat exchanger to said evaporator section, said second refrigerant passage comprising a capillary tube restriction;

third refrigerant passage means extending directly between said evaporator section and said second side of said refrigerant heat exchanger, for directly passing the entire quantity of refrigerant and absorbent solution having refrigerant dissolved therein contaminating said refrigerant from said evaporator section directly through said second side of said refrigerant heat exchanger in heat exchange relation with refrigerant passing through said first side thereof to evaporate refrigerant from said absorbent solution, thereby cooling the refrigerant passing through the first side of said refrigerant heat exchanger, and recovering useful work from the refrigerant absorbed in the absorbent solution which contaminates the refrigerant passed through said evaporator section; and fourth refrigerant passage means extending directly from said second side of said refrigerant heat exchanger to said absorber section for directly passing the entire quantity of refrigerant discharged from said second side of said refrigerant heat exchanger to said absorber section.

References Cited by the Examiner
UNITED STATES PATENTS

| | | | |
|---|---|---|---|
| 2,137,260 | 11/1938 | Boles | 62—503 |
| 2,263,067 | 11/1941 | Burggrabe | 62—142 |
| 2,860,494 | 11/1958 | Whitsel | 62—525 |

ROBERT A. O'LEARY, *Primary Examiner.*

C. R. REMKE, *Assistant Examiner.*